United States Patent
Knigge et al.

(10) Patent No.: US 9,153,268 B1
(45) Date of Patent: Oct. 6, 2015

(54) LUBRICANTS COMPRISING FLUORINATED GRAPHENE NANORIBBONS FOR MAGNETIC RECORDING MEDIA STRUCTURE

(71) Applicant: WD Media, Inc., San Jose, CA (US)

(72) Inventors: Bernhard E. Knigge, San Jose, CA (US); Mousumi M. Biswas, Cupertino, CA (US)

(73) Assignee: WD Media, LLC, San Jose, CA (US)

( * ) Notice: Subject to any disclaimer, the term of this patent is extended or adjusted under 35 U.S.C. 154(b) by 144 days.

(21) Appl. No.: 13/770,885

(22) Filed: Feb. 19, 2013

(51) Int. Cl.
*G11B 5/66* (2006.01)
*G11B 5/725* (2006.01)

(52) U.S. Cl.
CPC ..................... *G11B 5/725* (2013.01)

(58) Field of Classification Search
CPC ............................................. G11B 5/72
See application file for complete search history.

(56) References Cited

U.S. PATENT DOCUMENTS

| | | |
|---|---|---|
| 5,106,606 A | 4/1992 | Endo et al. |
| 5,113,302 A | 5/1992 | Shimizu et al. |
| 5,874,169 A | 2/1999 | Falcone |
| 6,013,161 A | 1/2000 | Chen et al. |
| 6,063,248 A | 5/2000 | Bourez et al. |
| 6,068,891 A | 5/2000 | O'Dell et al. |
| 6,086,730 A | 7/2000 | Liu et al. |
| 6,099,981 A | 8/2000 | Nishimori |
| 6,103,404 A | 8/2000 | Ross et al. |
| 6,117,499 A | 9/2000 | Wong et al. |
| 6,136,403 A | 10/2000 | Prabhakara et al. |
| 6,143,375 A | 11/2000 | Ross et al. |
| 6,145,849 A | 11/2000 | Bae et al. |
| 6,146,737 A | 11/2000 | Malhotra et al. |
| 6,149,696 A | 11/2000 | Jia |
| 6,150,015 A | 11/2000 | Bertero et al. |
| 6,156,404 A | 12/2000 | Ross et al. |
| 6,159,076 A | 12/2000 | Sun et al. |
| 6,164,118 A | 12/2000 | Suzuki et al. |
| 6,200,441 B1 | 3/2001 | Gornicki et al. |
| 6,204,995 B1 | 3/2001 | Hokkyo et al. |
| 6,206,765 B1 | 3/2001 | Sanders et al. |
| 6,210,819 B1 | 4/2001 | Lal et al. |
| 6,216,709 B1 | 4/2001 | Fung et al. |
| 6,221,119 B1 | 4/2001 | Homola |
| 6,248,395 B1 | 6/2001 | Homola et al. |
| 6,261,681 B1 | 7/2001 | Suekane et al. |
| 6,270,885 B1 | 8/2001 | Hokkyo et al. |

(Continued)

FOREIGN PATENT DOCUMENTS

WO 01-46351 12/2000

OTHER PUBLICATIONS

Robinson et al., "Properties of Fluorinated Graphene Films", Nano Letters, vol. 10, Jul. 2010, pp. 3001-3005.*

(Continued)

*Primary Examiner* — Holly Rickman

(57) ABSTRACT

A novel lubricant comprising a fluorinated graphene nanoribbon for a magnetic recording media structure is disclosed. The magnetic recording media structure includes a substrate, a magnetic recording layer for recording information disposed over the substrate, a protective overcoat layer for protecting the magnetic recording layer disposed over the magnetic recording layer, and a lubricant layer disposed over the protective overcoat layer and comprising a fluorinated graphene nanoribbon.

10 Claims, 6 Drawing Sheets

(56) References Cited

U.S. PATENT DOCUMENTS

| | | |
|---|---|---|
| 6,274,063 B1 | 8/2001 | Li et al. |
| 6,283,838 B1 | 9/2001 | Blake et al. |
| 6,287,429 B1 | 9/2001 | Moroishi et al. |
| 6,290,573 B1 | 9/2001 | Suzuki |
| 6,299,947 B1 | 10/2001 | Suzuki et al. |
| 6,303,217 B1 | 10/2001 | Malhotra et al. |
| 6,309,765 B1 | 10/2001 | Suekane et al. |
| 6,358,636 B1 | 3/2002 | Yang et al. |
| 6,362,452 B1 | 3/2002 | Suzuki et al. |
| 6,363,599 B1 | 4/2002 | Bajorek |
| 6,365,012 B1 | 4/2002 | Sato et al. |
| 6,381,090 B1 | 4/2002 | Suzuki et al. |
| 6,381,092 B1 | 4/2002 | Suzuki |
| 6,387,483 B1 | 5/2002 | Hokkyo et al. |
| 6,391,213 B1 | 5/2002 | Homola |
| 6,395,349 B1 | 5/2002 | Salamon |
| 6,403,919 B1 | 6/2002 | Salamon |
| 6,408,677 B1 | 6/2002 | Suzuki |
| 6,426,157 B1 | 7/2002 | Hokkyo et al. |
| 6,429,984 B1 | 8/2002 | Alex |
| 6,482,330 B1 | 11/2002 | Bajorek |
| 6,482,505 B1 | 11/2002 | Bertero et al. |
| 6,500,484 B2 | 12/2002 | Liu et al. |
| 6,500,567 B1 | 12/2002 | Bertero et al. |
| 6,528,124 B1 | 3/2003 | Nguyen |
| 6,548,821 B1 | 4/2003 | Treves et al. |
| 6,552,871 B2 | 4/2003 | Suzuki et al. |
| 6,565,719 B1 | 5/2003 | Lairson et al. |
| 6,566,674 B1 | 5/2003 | Treves et al. |
| 6,571,806 B2 | 6/2003 | Rosano et al. |
| 6,586,069 B2 | 7/2003 | Dykes et al. |
| 6,628,466 B2 | 9/2003 | Alex |
| 6,664,503 B1 | 12/2003 | Hsieh et al. |
| 6,670,055 B2 | 12/2003 | Tomiyasu et al. |
| 6,682,807 B2 | 1/2004 | Lairson et al. |
| 6,683,754 B2 | 1/2004 | Suzuki et al. |
| 6,700,735 B2 | 3/2004 | Gregory et al. |
| 6,730,420 B1 | 5/2004 | Bertero et al. |
| 6,743,528 B2 | 6/2004 | Suekane et al. |
| 6,759,138 B2 | 7/2004 | Tomiyasu et al. |
| 6,778,353 B1 | 8/2004 | Harper |
| 6,795,274 B1 | 9/2004 | Hsieh et al. |
| 6,855,232 B2 | 2/2005 | Jairson et al. |
| 6,857,937 B2 | 2/2005 | Bajorek |
| 6,893,748 B2 | 5/2005 | Bertero et al. |
| 6,899,959 B2 | 5/2005 | Bertero et al. |
| 6,916,558 B2 | 7/2005 | Umezawa et al. |
| 6,939,120 B1 | 9/2005 | Harper |
| 6,946,191 B2 | 9/2005 | Morikawa et al. |
| 6,967,798 B2 | 11/2005 | Homola et al. |
| 6,972,135 B2 | 12/2005 | Homola |
| 7,004,827 B1 | 2/2006 | Suzuki et al. |
| 7,006,323 B1 | 2/2006 | Suzuki |
| 7,016,154 B2 | 3/2006 | Nishihira |
| 7,019,924 B2 | 3/2006 | McNeil et al. |
| 7,038,068 B2 | 5/2006 | Burns |
| 7,045,215 B2 | 5/2006 | Shimokawa |
| 7,070,870 B2 | 7/2006 | Bertero et al. |
| 7,090,934 B2 | 8/2006 | Hokkyo et al. |
| 7,099,112 B1 | 8/2006 | Harper |
| 7,105,241 B2 | 9/2006 | Shimokawa et al. |
| 7,119,990 B2 | 10/2006 | Bajorek et al. |
| 7,135,274 B2 | 11/2006 | Nariyuki et al. |
| 7,147,790 B2 | 12/2006 | Wachenschwanz et al. |
| 7,161,753 B2 | 1/2007 | Wachenschwanz et al. |
| 7,166,319 B2 | 1/2007 | Ishiyama |
| 7,166,374 B2 | 1/2007 | Suekane et al. |
| 7,169,487 B2 | 1/2007 | Kawai et al. |
| 7,174,775 B2 | 2/2007 | Ishiyama |
| 7,179,549 B2 | 2/2007 | Malhotra et al. |
| 7,184,139 B2 | 2/2007 | Treves et al. |
| 7,196,860 B2 | 3/2007 | Alex |
| 7,199,977 B2 | 4/2007 | Suzuki et al. |
| 7,208,236 B2 | 4/2007 | Morikawa et al. |
| 7,220,500 B1 | 5/2007 | Tomiyasu et al. |
| 7,229,266 B2 | 6/2007 | Harper |
| 7,232,932 B2 | 6/2007 | Howell et al. |
| 7,239,970 B2 | 7/2007 | Treves et al. |
| 7,252,897 B2 | 8/2007 | Shimokawa et al. |
| 7,277,254 B2 | 10/2007 | Shimokawa et al. |
| 7,281,920 B2 | 10/2007 | Homola et al. |
| 7,292,329 B2 | 11/2007 | Treves et al. |
| 7,301,726 B1 | 11/2007 | Suzuki |
| 7,302,148 B2 | 11/2007 | Treves et al. |
| 7,305,119 B2 | 12/2007 | Treves et al. |
| 7,314,404 B2 | 1/2008 | Singh et al. |
| 7,320,584 B1 | 1/2008 | Harper et al. |
| 7,329,114 B2 | 2/2008 | Harper et al. |
| 7,375,362 B2 | 5/2008 | Treves et al. |
| 7,420,886 B2 | 9/2008 | Tomiyasu et al. |
| 7,425,719 B2 | 9/2008 | Treves et al. |
| 7,471,484 B2 | 12/2008 | Wachenschwanz et al. |
| 7,488,852 B2 | 2/2009 | Marchionni et al. |
| 7,498,062 B2 | 3/2009 | Calcaterra et al. |
| 7,510,999 B2 | 3/2009 | Deng et al. |
| 7,531,485 B2 | 5/2009 | Hara et al. |
| 7,537,846 B2 | 5/2009 | Ishiyama et al. |
| 7,549,209 B2 | 6/2009 | Wachenschwanz et al. |
| 7,569,490 B2 | 8/2009 | Staud |
| 7,597,792 B2 | 10/2009 | Homola et al. |
| 7,597,973 B2 | 10/2009 | Ishiyama |
| 7,608,193 B2 | 10/2009 | Wachenschwanz et al. |
| 7,632,087 B2 | 12/2009 | Homola |
| 7,656,615 B2 | 2/2010 | Wachenschwanz et al. |
| 7,682,546 B2 | 3/2010 | Harper |
| 7,684,152 B2 | 3/2010 | Suzuki et al. |
| 7,686,606 B2 | 3/2010 | Harper et al. |
| 7,686,991 B2 | 3/2010 | Harper |
| 7,695,833 B2 | 4/2010 | Ishiyama |
| 7,722,968 B2 | 5/2010 | Ishiyama |
| 7,733,605 B2 | 6/2010 | Suzuki et al. |
| 7,736,768 B2 | 6/2010 | Ishiyama |
| 7,755,861 B1 | 7/2010 | Li et al. |
| 7,758,732 B1 | 7/2010 | Calcaterra et al. |
| 7,794,880 B2 * | 9/2010 | Yazami et al. ............ 429/231.7 |
| 7,833,639 B2 | 11/2010 | Sonobe et al. |
| 7,833,641 B2 | 11/2010 | Tomiyasu et al. |
| 7,910,159 B2 | 3/2011 | Jung |
| 7,911,736 B2 | 3/2011 | Bajorek |
| 7,924,519 B2 | 4/2011 | Lambert |
| 7,944,165 B1 | 5/2011 | O'Dell |
| 7,944,643 B1 | 5/2011 | Jiang et al. |
| 7,955,723 B2 | 6/2011 | Umezawa et al. |
| 7,983,003 B2 | 7/2011 | Sonobe et al. |
| 7,993,497 B2 | 8/2011 | Moroishi et al. |
| 7,993,765 B2 | 8/2011 | Kim et al. |
| 7,998,912 B2 | 8/2011 | Chen et al. |
| 8,002,901 B1 | 8/2011 | Chen et al. |
| 8,003,237 B2 | 8/2011 | Sonobe et al. |
| 8,012,920 B2 | 9/2011 | Shimokawa |
| 8,038,863 B2 | 10/2011 | Homola |
| 8,057,926 B2 | 11/2011 | Ayama et al. |
| 8,062,778 B2 | 11/2011 | Suzuki et al. |
| 8,064,156 B1 | 11/2011 | Suzuki et al. |
| 8,076,013 B2 | 12/2011 | Sonobe et al. |
| 8,092,931 B2 | 1/2012 | Ishiyama et al. |
| 8,100,685 B1 | 1/2012 | Harper et al. |
| 8,101,054 B2 | 1/2012 | Chen et al. |
| 8,125,723 B1 | 2/2012 | Nichols et al. |
| 8,125,724 B1 | 2/2012 | Nichols et al. |
| 8,137,517 B1 | 3/2012 | Bourez |
| 8,142,916 B2 | 3/2012 | Umezawa et al. |
| 8,163,093 B1 | 4/2012 | Chen et al. |
| 8,171,949 B1 | 5/2012 | Lund et al. |
| 8,173,282 B1 | 5/2012 | Sun et al. |
| 8,178,480 B2 | 5/2012 | Hamakubo et al. |
| 8,206,789 B2 | 6/2012 | Suzuki |
| 8,217,121 B2 | 7/2012 | Tonelli |
| 8,218,260 B2 | 7/2012 | Iamratanakul et al. |
| 8,222,190 B2 | 7/2012 | Zhamu et al. |
| 8,236,626 B2 | 8/2012 | Dai et al. |
| 8,247,095 B2 | 8/2012 | Champion et al. |
| 8,257,783 B2 | 9/2012 | Suzuki et al. |
| 8,298,609 B1 | 10/2012 | Liew et al. |

(56) References Cited

U.S. PATENT DOCUMENTS

| | | |
|---|---|---|
| 8,298,689 B2 | 10/2012 | Sonobe et al. |
| 8,309,239 B2 | 11/2012 | Umezawa et al. |
| 8,316,668 B1 | 11/2012 | Chan et al. |
| 8,331,056 B2 | 12/2012 | O'Dell |
| 8,354,618 B1 | 1/2013 | Chen et al. |
| 8,367,228 B2 | 2/2013 | Sonobe et al. |
| 8,383,209 B2 | 2/2013 | Ayama |
| 8,394,243 B1 | 3/2013 | Jung et al. |
| 8,397,751 B1 | 3/2013 | Chan et al. |
| 8,399,809 B1 | 3/2013 | Bourez |
| 8,402,638 B1 | 3/2013 | Treves et al. |
| 8,404,056 B1 | 3/2013 | Chen et al. |
| 8,404,369 B2 | 3/2013 | Ruffini et al. |
| 8,404,370 B2 | 3/2013 | Sato et al. |
| 8,406,918 B2 | 3/2013 | Tan et al. |
| 8,414,966 B2 | 4/2013 | Yasumori et al. |
| 8,425,975 B2 | 4/2013 | Ishiyama |
| 8,431,257 B2 | 4/2013 | Kim et al. |
| 8,431,258 B2 | 4/2013 | Onoue et al. |
| 8,453,315 B2 | 6/2013 | Kajiwara et al. |
| 8,488,276 B1 | 7/2013 | Jung et al. |
| 8,491,800 B1 | 7/2013 | Dorsey |
| 8,492,009 B1 | 7/2013 | Homola et al. |
| 8,492,011 B2 | 7/2013 | Itoh et al. |
| 8,496,466 B1 | 7/2013 | Treves et al. |
| 8,517,364 B1 | 8/2013 | Crumley et al. |
| 8,517,657 B2 | 8/2013 | Chen et al. |
| 8,524,052 B1 | 9/2013 | Tan et al. |
| 8,530,065 B1 | 9/2013 | Chernyshov et al. |
| 8,546,000 B2 | 10/2013 | Umezawa |
| 8,551,253 B2 | 10/2013 | Na'im et al. |
| 8,551,627 B2 | 10/2013 | Shimada et al. |
| 8,556,566 B1 | 10/2013 | Suzuki et al. |
| 8,559,131 B2 | 10/2013 | Masuda et al. |
| 8,562,748 B1 | 10/2013 | Chen et al. |
| 8,565,050 B1 | 10/2013 | Bertero et al. |
| 8,570,844 B1 | 10/2013 | Yuan et al. |
| 8,580,410 B2 | 11/2013 | Onoue |
| 8,584,687 B1 | 11/2013 | Chen et al. |
| 8,591,709 B1 | 11/2013 | Lim et al. |
| 8,592,061 B2 | 11/2013 | Onoue et al. |
| 8,596,287 B1 | 12/2013 | Chen et al. |
| 8,597,723 B1 | 12/2013 | Jung et al. |
| 8,603,649 B2 | 12/2013 | Onoue |
| 8,603,650 B2 | 12/2013 | Sonobe et al. |
| 8,605,388 B2 | 12/2013 | Yasumori et al. |
| 8,605,555 B1 | 12/2013 | Chernyshov et al. |
| 8,608,147 B1 | 12/2013 | Yap et al. |
| 8,609,263 B1 | 12/2013 | Chernyshov et al. |
| 8,619,381 B2 | 12/2013 | Moser et al. |
| 8,623,528 B2 | 1/2014 | Umezawa et al. |
| 8,623,529 B2 | 1/2014 | Suzuki |
| 8,634,155 B2 | 1/2014 | Yasumori et al. |
| 8,658,003 B1 | 2/2014 | Bourez |
| 8,658,292 B1 | 2/2014 | Mallary et al. |
| 8,665,541 B2 | 3/2014 | Saito |
| 8,668,953 B1 | 3/2014 | Buechel-Rimmel |
| 8,674,327 B1 | 3/2014 | Poon et al. |
| 8,685,214 B1 | 4/2014 | Moh et al. |
| 8,696,404 B2 | 4/2014 | Sun et al. |
| 8,711,499 B1 | 4/2014 | Desai et al. |
| 8,743,666 B1 | 6/2014 | Bertero et al. |
| 8,758,912 B2 | 6/2014 | Srinivasan et al. |
| 8,787,124 B1 | 7/2014 | Chernyshov et al. |
| 8,787,130 B1 | 7/2014 | Yuan et al. |
| 8,791,391 B2 | 7/2014 | Bourez |
| 8,795,765 B2 | 8/2014 | Koike et al. |
| 8,795,790 B2 | 8/2014 | Sonobe et al. |
| 8,795,857 B2 | 8/2014 | Ayama et al. |
| 8,800,322 B1 | 8/2014 | Chan et al. |
| 8,811,129 B1 | 8/2014 | Yuan et al. |
| 8,817,410 B1 | 8/2014 | Moser et al. |
| 2002/0060883 A1 | 5/2002 | Suzuki |
| 2003/0022024 A1 | 1/2003 | Wachenschwanz |
| 2003/0096141 A1 | 5/2003 | Chen |
| 2004/0022387 A1 | 2/2004 | Weikle |
| 2004/0096675 A1 | 5/2004 | Tani et al. |
| 2004/0132301 A1 | 7/2004 | Harper et al. |
| 2004/0202793 A1 | 10/2004 | Harper et al. |
| 2004/0202865 A1 | 10/2004 | Homola et al. |
| 2004/0209123 A1 | 10/2004 | Bajorek et al. |
| 2004/0209470 A1 | 10/2004 | Bajorek |
| 2005/0036223 A1 | 2/2005 | Wachenschwanz et al. |
| 2005/0037932 A1 | 2/2005 | Liu et al. |
| 2005/0142990 A1 | 6/2005 | Homola |
| 2005/0150862 A1 | 7/2005 | Harper et al. |
| 2005/0151282 A1 | 7/2005 | Harper et al. |
| 2005/0151283 A1 | 7/2005 | Bajorek et al. |
| 2005/0151300 A1 | 7/2005 | Harper et al. |
| 2005/0155554 A1 | 7/2005 | Saito |
| 2005/0167867 A1 | 8/2005 | Bajorek et al. |
| 2005/0263401 A1 | 12/2005 | Olsen et al. |
| 2006/0147758 A1 | 7/2006 | Jung et al. |
| 2006/0181697 A1 | 8/2006 | Treves et al. |
| 2006/0207890 A1 | 9/2006 | Staud |
| 2007/0070549 A1 | 3/2007 | Suzuki et al. |
| 2007/0245909 A1 | 10/2007 | Homola |
| 2008/0075845 A1 | 3/2008 | Sonobe et al. |
| 2008/0093760 A1 | 4/2008 | Harper et al. |
| 2008/0305975 A1 | 12/2008 | Liu et al. |
| 2009/0033164 A1 | 2/2009 | Khan |
| 2009/0117408 A1 | 5/2009 | Umezawa et al. |
| 2009/0136784 A1 | 5/2009 | Suzuki et al. |
| 2009/0169922 A1 | 7/2009 | Ishiyama |
| 2009/0191331 A1 | 7/2009 | Umezawa et al. |
| 2009/0202866 A1 | 8/2009 | Kim et al. |
| 2009/0311557 A1 | 12/2009 | Onoue et al. |
| 2010/0127312 A1 | 5/2010 | Grebel et al. |
| 2010/0143752 A1 | 6/2010 | Ishibashi et al. |
| 2010/0190035 A1 | 7/2010 | Sonobe et al. |
| 2010/0196619 A1 | 8/2010 | Ishiyama |
| 2010/0196740 A1 | 8/2010 | Ayama et al. |
| 2010/0209601 A1 | 8/2010 | Shimokawa et al. |
| 2010/0215992 A1 | 8/2010 | Horikawa et al. |
| 2010/0232065 A1 | 9/2010 | Suzuki et al. |
| 2010/0247965 A1 | 9/2010 | Onoue |
| 2010/0261039 A1 | 10/2010 | Itoh et al. |
| 2010/0279151 A1 | 11/2010 | Sakamoto et al. |
| 2010/0300884 A1 | 12/2010 | Homola et al. |
| 2010/0304186 A1 | 12/2010 | Shimokawa |
| 2011/0046027 A1* | 2/2011 | Zhamu et al. ................. 508/113 |
| 2011/0097603 A1 | 4/2011 | Onoue |
| 2011/0097604 A1 | 4/2011 | Onoue |
| 2011/0102944 A1 | 5/2011 | Suzuki |
| 2011/0151278 A1* | 6/2011 | Gurney et al. ................. 428/800 |
| 2011/0171495 A1 | 7/2011 | Tachibana et al. |
| 2011/0206947 A1 | 8/2011 | Tachibana et al. |
| 2011/0212346 A1 | 9/2011 | Onoue et al. |
| 2011/0223446 A1 | 9/2011 | Onoue et al. |
| 2011/0244119 A1 | 10/2011 | Umezawa et al. |
| 2011/0299194 A1 | 12/2011 | Aniya et al. |
| 2011/0303121 A1 | 12/2011 | Geim et al. |
| 2011/0311841 A1 | 12/2011 | Saito et al. |
| 2012/0028858 A1 | 2/2012 | Wadgaonkar et al. |
| 2012/0069466 A1 | 3/2012 | Okamoto et al. |
| 2012/0070692 A1 | 3/2012 | Sato et al. |
| 2012/0077060 A1 | 3/2012 | Ozawa |
| 2012/0085991 A1 | 4/2012 | Cohen et al. |
| 2012/0127599 A1 | 5/2012 | Shimokawa et al. |
| 2012/0127601 A1 | 5/2012 | Suzuki et al. |
| 2012/0129009 A1 | 5/2012 | Sato et al. |
| 2012/0140359 A1 | 6/2012 | Tachibana |
| 2012/0141833 A1 | 6/2012 | Umezawa et al. |
| 2012/0141835 A1 | 6/2012 | Sakamoto |
| 2012/0148875 A1 | 6/2012 | Hamakubo et al. |
| 2012/0156523 A1 | 6/2012 | Seki et al. |
| 2012/0164488 A1 | 6/2012 | Shin et al. |
| 2012/0170152 A1 | 7/2012 | Sonobe et al. |
| 2012/0171369 A1 | 7/2012 | Koike et al. |
| 2012/0175243 A1 | 7/2012 | Fukuura et al. |
| 2012/0189872 A1 | 7/2012 | Umezawa et al. |
| 2012/0195821 A1 | 8/2012 | Sun et al. |
| 2012/0196049 A1 | 8/2012 | Azuma et al. |
| 2012/0207919 A1 | 8/2012 | Sakamoto et al. |

(56) References Cited

U.S. PATENT DOCUMENTS

| | | |
|---|---|---|
| 2012/0225217 A1 | 9/2012 | Itoh et al. |
| 2012/0251842 A1 | 10/2012 | Yuan et al. |
| 2012/0251843 A1 | 10/2012 | Yan et al. |
| 2012/0251846 A1 | 10/2012 | Desai et al. |
| 2012/0276417 A1 | 11/2012 | Shimokawa et al. |
| 2012/0308722 A1 | 12/2012 | Suzuki et al. |
| 2013/0040167 A1 | 2/2013 | Alagarsamy et al. |
| 2013/0071694 A1 | 3/2013 | Srinivasan et al. |
| 2013/0165029 A1 | 6/2013 | Sun et al. |
| 2013/0175252 A1 | 7/2013 | Bourez |
| 2013/0216865 A1 | 8/2013 | Yasumori et al. |
| 2013/0230647 A1 | 9/2013 | Onoue et al. |
| 2013/0314815 A1 | 11/2013 | Yuan et al. |
| 2014/0011054 A1 | 1/2014 | Suzuki |
| 2014/0044992 A1 | 2/2014 | Onoue |
| 2014/0050843 A1 | 2/2014 | Yi et al. |
| 2014/0151360 A1 | 6/2014 | Landdell et al. |
| 2014/0234666 A1 | 8/2014 | Knigge et al. |

OTHER PUBLICATIONS

Tang et al., "STructural and Electronic Properties of Hybrid Fluorographene-Graphen Nanoribbons: Insight from First-Principle Calculations", J Phys Chem, vol. 115, Jul. 2011, pp. 16644-16651.*
Notification of Trans. of the International Search Report & Written Opinion of the Int'l Searching Authority dated Jun. 19, 2014 for related PCT/2014/017073, pp. 1-11.

* cited by examiner

LUBRICANTS COMPRISING FLUORINATED GRAPHENE NANORIBBONS FOR MAGNETIC RECORDING MEDIA STRUCTURE

FIELD OF THE INVENTION

The present invention generally relates to lubricants for magnetic recording media and, in particular, relates to lubricants comprising fluorinated graphene nanoribbons for magnetic recording media structure.

BACKGROUND

Conventional lubricants used for magnetic recording media applications, such as Tetraol, have problems associated with the presence of —OH end groups. These problems include clustering due to interactions between end groups, a thicker lube layer due to formation of inverted U-shaped structures, thermal decomposition at high temperature at the ether bond, and lube mogul formation due to high mobility and clustering.

Some of these problems associated with conventional lubricants are illustrated in FIGS. 1 and 2. For example, FIG. 1 illustrates the end-group clustering problem due to interactions between —OH end groups and also the normal lubrication layer thickness on the disk. FIG. 2 illustrates formation of inverted U-shaped structures resulting from the attachment of the end groups on the COC surface. Additionally, for an HAMR (Heat Assisted Magnetic Recording) system, in which the recording takes place at an elevated temperature, the surface adhesion may decrease, resulting in increases in lube mobility, lube mogul formation and lube decomposition. All of these problems contribute to a reduced reliability and performance for the hard disk drive (HDD).

BRIEF SUMMARY OF THE SUBJECT DISCLOSURE

In some aspects, the above-identified problems associated with the conventional lubricants may be eliminated or reduced by the use of fluorinated graphene nanoribbons (FGNRs) as lubricants for magnetic recording media applications.

In certain aspects, a magnetic recording media structure is provided. The magnetic recording media structure includes a substrate, a magnetic recording layer for recording information disposed over the substrate, a protective overcoat layer for protecting the magnetic recording layer disposed over the magnetic recording layer, and a lubricant layer disposed over the protective overcoat layer and comprising a fluorinated graphene nanoribbon.

In certain aspects, a method of lubricating a hard disk drive is provided. The method includes providing a magnetic recording media stack comprising a magnetic recording layer for recording information and a protective overcoat layer disposed over the magnetic recording layer and providing a lubricant layer comprising a fluorinated graphene nanoribbon on the protective overcoat layer.

In certain aspects, a lubricant for a magnetic recording media structure comprising a fluorinated graphene nanoribbon is provided.

DETAILED DESCRIPTION

Figure 3:
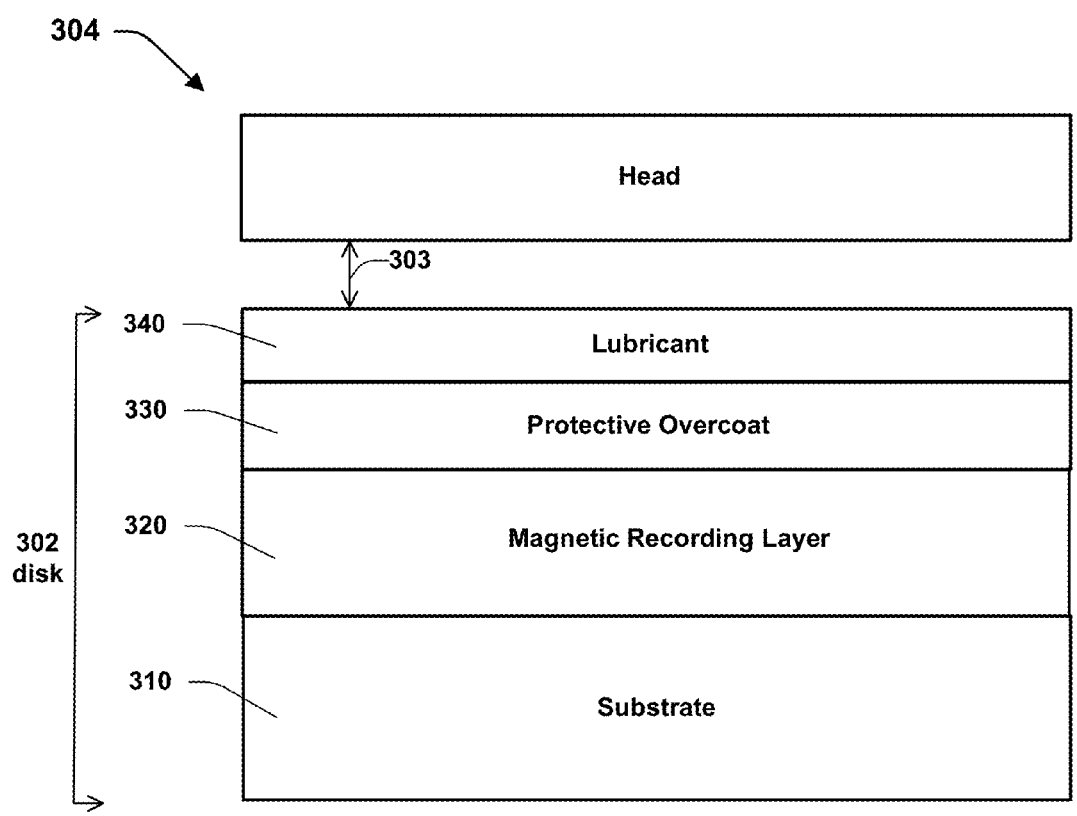
FIG. 3 is a diagram depicting a HDD system comprising a magnetic recording media stack ("disk") and a magnetic read/write head ("head") according to certain aspects of the subject disclosure.

FIG. 3 is a diagram depicting a HDD system 300 comprising a magnetic recording media stack ("disk") 302 and a magnetic read/write head ("head") 304. The head 304 is disposed above the disk 302 and separated from each other by a head-media spacing 303. The magnetic recording media stack 302 includes a substrate 310, a magnetic recording layer 320 for recording information, a protective overcoat 130 for protecting the magnetic recording layer 320, and lubricant 340 for lubricating the protecting overcoat 130. The lubricant 340 is designed to prevent a catastrophic crash when the head 304 comes in contact with the disk 302. In certain embodiments, the protective overcoat layer 330 is carbon overcoat (COC) and has a thickness between about 0.5 and 4 nm. In some embodiments, the lubricant 340 may be directly applied to the magnetic recording layer 320.

Figure 4:
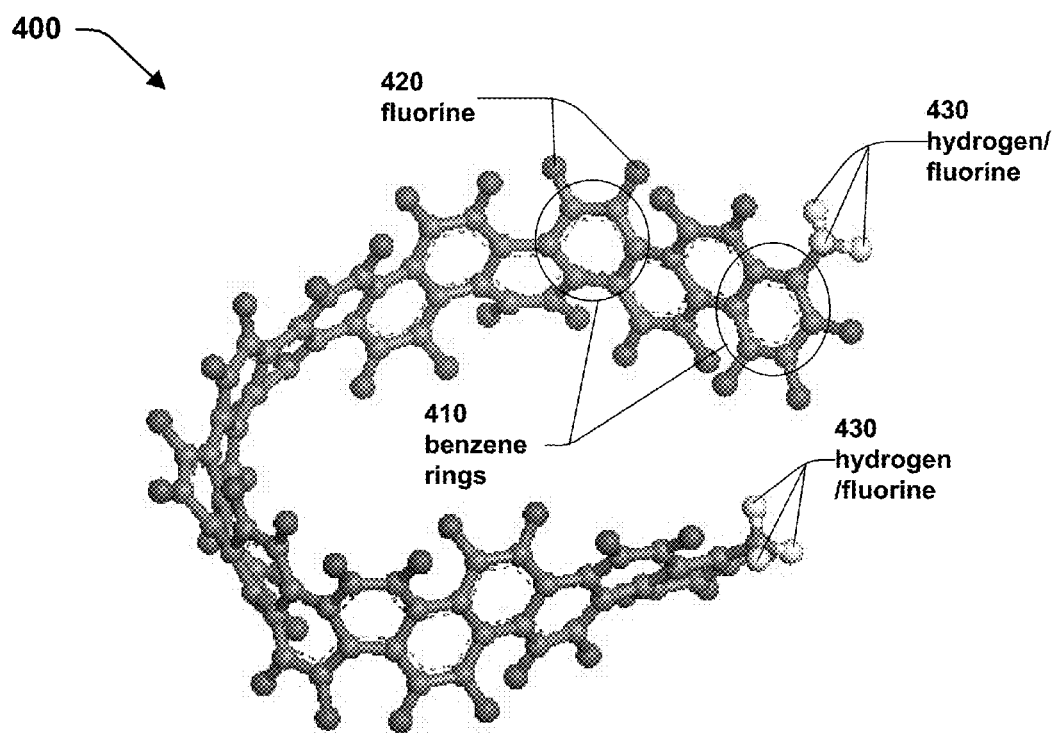
FIG. 4 is a diagram depicting one fluorinated graphene nanoribbon (FGNR) that can be used as lubricant in the magnetic recording media stack shown in FIG. 1 according to certain aspects of the subject disclosure.

FIG. 4 is a diagram depicting one fluorinated graphene nanoribbon (FGNR) 400 that can be used as lubricant 340 in the magnetic recording media stack 302 shown in FIG. 3 according to certain aspects of the subject disclosure. The FGNR 400 is a narrow strip of graphene comprising a plurality of benzene rings 410 having fluorine atoms 420 attached thereto. Two benzene rings at the ends of the FGNR 400 also have hydrogen or flurorine atoms 430 attached thereto. In some embodiments, one or more of the hydrogen/fluorine atoms 430 may be replaced with any other functional groups.

In the illustrated example of FIG. 4, the FGNR 400 is about 40 angstroms long and 7 angstroms wide and has a molecular weight of 1898 gm/mole. The FGNR 400 may be prepared at desired length and width by various methods known in the art. Some of the known methods are disclosed in U.S. Pat. No. 8,236,626, U.S. Patent Application No. 20120085991 and U.S. Patent Application No. 20120195821, each of which is incorporated herein by reference in its entirety for all purposes. In certain embodiments, depending on the number of benzene rings 410 along its length direction, the FGNR 400 can have a length between about 1 and 30 nm. In some embodiments, depending on the number of benzene rights 410 along its width direction, the FGNR 400 can have a width between about 2 and 20 angstroms.

FGNRs may be grown in situ on the protective overcoat 330 (FIG. 3), such as carbon over coat (COC), during fabrication of the magnetic recording media stack or disk 302 or may be later applied to the surface of the COC after fabricating the disk 302. In certain embodiments, the disk 302 is dip-coated with the FGNR molecules. With the FGNR 400 applied thereon, the surface of the protective overcoat 130

(e.g., COC) becomes frictionless. In some embodiments, the FGNRs form a lubricant film having a thickness of between about 0.5 and 3 nm.

Furthermore, the FGNR 400 has excellent electrical and thermal conductivity, which is important for HAMR applications. Thus, the FGNR 400 exhibits superior lubrication and wear resistance; and, for HAMR applications, the FGNR 400 can work as an effective heat transfer media.

Molecular dynamic simulations have been performed using LAMMPS (Large Scale Atomistic Molecular Massively Parallel Simulator, by Sandia National Lab). In the simulations, sixteen FGNRs were placed on a COC (diamond like carbon) surface. The COC surface is nitrogenated (10%) and contains 2% surface —OH group. Each of the head 304 and the disk 302 included a COC having surface dimensions of about 85×85 angstroms and about 10 angstroms thick. The head COC is a hydrogenated DLC.

Figure 1:
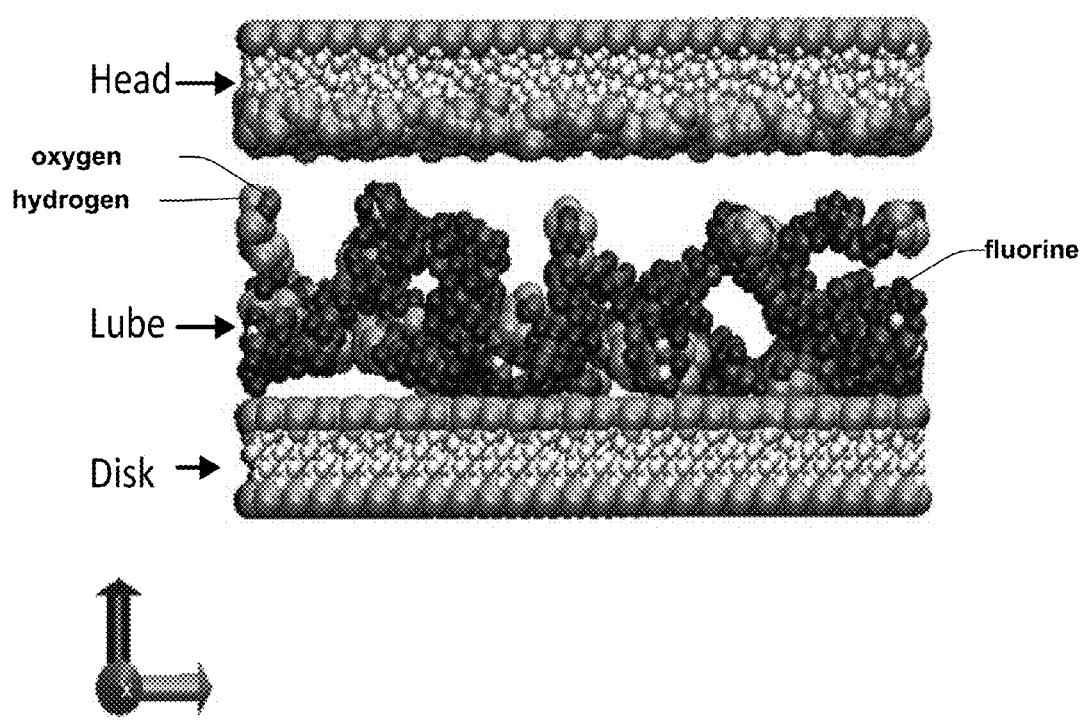
FIG. 1 is a diagram illustrating the end-group clustering problem due to interactions between —OH end groups associated with conventional lubricants.
Figure 2:
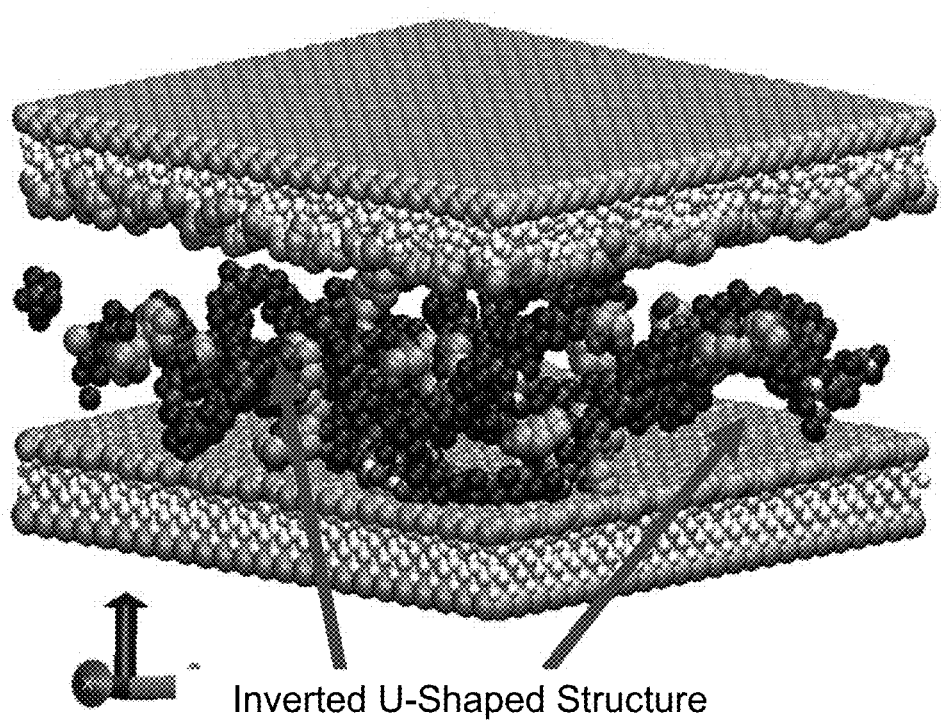
FIG. 2 is a diagram illustrating formation of inverted U-shaped structures resulting from the attachment of the end groups on the COC surface associated with conventional lubricants.
Figure 5A:
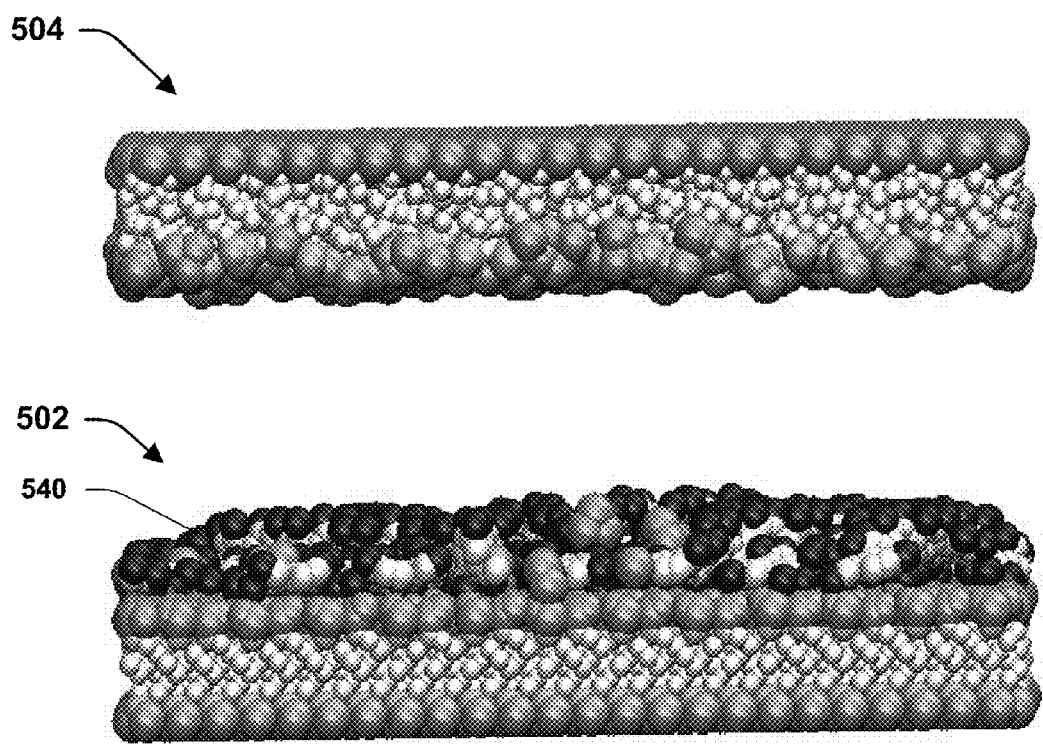
FIG. 5A is a diagram depicting a cross-sectional view of a disk with FGNR lubricant and a head according to certain aspects of the subject disclosure.
Figure 5B:
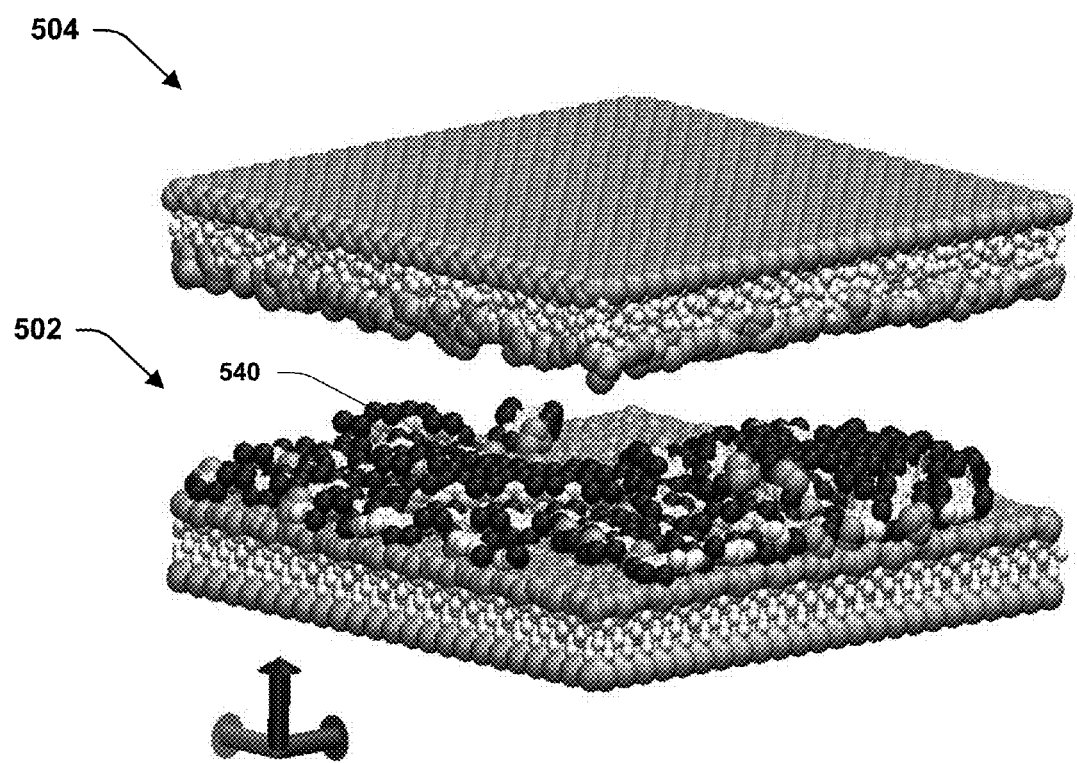
FIG. 5B is a diagram depicting a perspective view of a disk with FGNR lubricant and a head according to certain aspects of the subject disclosure.

After equilibrating the FGNRs on a COC disk surface for 100 ps simulation time, it was found that the FGNRs formed a uniform film on the COC surface with a better surface coverage compared to Tetraol with similar molecular weight (FIGS. 1 and 2). FIG. 5A and FIG. 5B are diagrams depicting cross-sectional and perspective views, respectively, of a disk 502 with FGNR lubricant 540 and a head 504 according to certain aspects of the subject disclosure.

The simulations demonstrate that the FGNR provides a number of advantages compared to conventional lubricants. The advantages include an increased COC surface adhesion and a reduced clustering. Due to absence of C—O—C bond in its molecular structure, the FGNR also provides reduced thermal and catalytic decomposition as compared to conventional lubricants such as Tetraol. Additionally, due to absence of —OH end groups, lube clustering is reduced or eliminated. Furthermore, due to interaction of benzene rings with the COC surface, the FGNR provides a better surface adhesion resulting in a greater structural stability for the lubricant film.

The FGNR also forms a thinner film on the COC as compared to conventional lubricants such as Tetraol. In the simulations, a FGNR film having a thickness of about 8 angstroms was obtained as compared to about 14 angstroms for Tetraol or other conventional lubes with similar molecular weight. As illustrated in FIG. 3, the conventional lubricants attach on the COC surface by the end group and form an inverted U shaped structure resulting in a thicker film and a higher head-media spacing. By contrast, as illustrated in FIGS. 5A and 5B, the benzene rings 410 of the FGNR 400 (FIG. 4) lie parallel to the COC surface resulting in a thinner film and a lower head-media spacing. In the illustrated example of FIGS. 5A and 5B, the thinner FGNR film (8 angstroms) resulted in the head-media spacing of 27 angstroms.

Lubricants with benzene-only end groups have less clustering compared to conventional lubricants with —OH end groups. Also, since the FGNR does not contain a C—O—C group, there is lower thermal and catalytic decomposition. Interaction energy with the disk per FGNR molecule is about −6.36 kcal/molecule (negative sign indicated more attractive nature, or as cohesive energy) compared to 68.98 kcal/molecule for similar molecular weight Tetraol. Thus, the FGNR molecules have less mobility and lube clustering (lube mogul) is reduced under shear flow condition.

Accordingly, the use of FGNR as lubricant in a magnetic recording media stack can reduce or eliminate many problems associated with conventional lubricants resulting in improved reliability and performance for the HDD.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

We claim:

1. A magnetic recording media structure comprising:
   a substrate;
   a magnetic recording layer for recording information disposed over the substrate;
   a protective overcoat layer for protecting the magnetic recording layer disposed over the magnetic recording layer; and
   a lubricant layer disposed over the protective overcoat layer and comprising a fluorinated graphene nanoribbon, wherein the protective overcoat layer comprises a carbon overcoat (COC).

2. The magnetic recording media structure of claim 1, wherein the magnetic recording media structure is a heat assisted magnetic recording (HAMR) media structure.

3. The magnetic recording media structure of claim 1, wherein the protective overcoat layer has a thickness between about 0.5 and 4 nm.

4. The magnetic recording media structure of claim 1, wherein the lubricant layer has a thickness between about 0.5 and 3 nm.

5. A magnetic recording media structure comprising:
   a substrate;
   a magnetic recording layer for recording information disposed over the substrate;
   a protective overcoat layer for protecting the magnetic recording layer disposed over the magnetic recording layer; and
   a lubricant layer disposed over the protective overcoat layer and comprising a fluorinated graphene nanoribbon, wherein the fluorinated graphene nanoribbon has a length between about 1 and 30 nm.

6. A magnetic recording media structure comprising:
   a substrate;
   a magnetic recording layer for recording information disposed over the substrate;

a protective overcoat layer for protecting the magnetic recording layer disposed over the magnetic recording layer; and a lubricant layer disposed over the protective overcoat layer and comprising a fluorinated graphene nanoribbon, wherein the fluorinated graphene nanoribbon has a width between about 2 and 20 angstroms.

7. A method of lubricating a hard disk drive, the method comprising:

providing a magnetic recording media stack comprising a magnetic recording layer for recording information and a protective overcoat layer disposed over the magnetic recording layer; and providing a lubricant layer comprising a fluorinated graphene nanoribbon on the protective overcoat layer, wherein the protective overcoat layer comprises a carbon overcoat (COC).

8. The method of claim 7, where in the fluorinated graphene nanoribbon is grown in situ on the COC during fabrication of the magnetic recording media stack.

9. The method of claim 7, wherein the fluorinated graphene nanoribbon is applied to the COC after the magnetic recording media stack has been fabricated.

10. The method of claim 9, wherein the magnetic recording media stack is dip-coated with the fluorinated graphene nanoribbon.

* * * * *